United States Patent [19]
Wadia et al.

[11] Patent Number: 5,480,284
[45] Date of Patent: Jan. 2, 1996

[54] SELF BLEEDING ROTOR BLADE

[75] Inventors: Aspi R. Wadia, Loveland; Mark J. Mielke, Blanchester, both of Ohio

[73] Assignee: General Electric Company, Cincinnati, Ohio

[21] Appl. No.: 169,278

[22] Filed: Dec. 20, 1993

[51] Int. Cl.$^6$ ........................................................ F01D 5/18
[52] U.S. Cl. ................................................. 416/91; 416/92
[58] Field of Search ......................... 415/171.1; 416/90 R, 416/91, 92, 90 A

[56] References Cited

U.S. PATENT DOCUMENTS

| | | | |
|---|---|---|---|
| 1,829,674 | 10/1931 | Rosenlöcher | 416/92 |
| 2,156,133 | 4/1939 | Troller | 416/91 |
| 3,871,791 | 3/1975 | Guy et al. | 416/193 |
| 5,167,489 | 12/1992 | Wadia et al. | 415/282.1 |

FOREIGN PATENT DOCUMENTS

| | | | |
|---|---|---|---|
| 1087323 | 2/1955 | France | 416/92 |
| 1219807 | 6/1966 | Germany | 416/91 |
| 0497048 | 12/1938 | United Kingdom | 416/91 |
| 0680458 | 10/1952 | United Kingdom | 416/91 |
| 1532815 | 11/1978 | United Kingdom | 416/91 |

*Primary Examiner*—Edward K. Look
*Assistant Examiner*—Mark Sgantzos
*Attorney, Agent, or Firm*—Andrew C. Hess; Patrick R. Scanlon

[57] ABSTRACT

A self bleeding rotor blade and method of operation are disclosed for reducing boundary layer thickness for improved performance. The rotor blade includes an outer surface configured for pressurizing air flowable thereover with bleed apertures being disposed therein for bleeding a portion of boundary layer air from the outer surface during operation and thereby decreasing its thickness for improving aerodynamic performance of the blade.

11 Claims, 5 Drawing Sheets

SELF BLEEDING ROTOR BLADE

The present invention relates generally to gas turbine engines, and, more specifically, to rotor blades therein for pressurizing air.

BACKGROUND OF THE INVENTION

A gas turbine engine such as that configured for powering an aircraft in flight conventionally includes in serial flow communication a fan, a compressor, a combustor, a high pressure turbine (HPT), and a low pressure or power turbine (LPT). Ambient air enters the fan wherein it is initially pressurized, and in turn a portion thereof flows to the compressor wherein it is further pressurized and discharged to the combustor wherein it is mixed with fuel and ignited for generating hot combustion gases which flow downstream to the HPT. The HPT includes one or more stages of turbine blades specifically configured for extracting energy from the combustion gases for powering the compressor through a shaft connected therebetween. The combustion gases lose pressure in the HPT and then flow to the LPT which includes additional turbine blades also configured for extracting additional energy from the lower pressure combustion gases for powering the fan connected thereto by another shaft.

The fan and compressor include respective rotor blades which are configured for pressurizing the relatively cool air which is in contrast to the turbine blades of the HPT and the LPT which are configured for extracting energy from the hot combustion gases with a resulting reduction in pressure thereof. The energy extracted from the combustion gases is in turn imparted to the air being pressurized in the fan and compressor.

A fan blade as used herein is merely a type of generic compressor blade since both blades are effective for imparting energy into the air for increasing its pressure to different levels. The fan blade is relatively large for moving larger amounts of airflow at reduced pressure for providing a substantial portion of propulsion thrust from the engine. The fan blades are typically configured in one or two stages for use in conventional high bypass, turbofan, commercial aircraft engines or lower bypass military engines.

The rotor blades found in a typical axial compressor are configured in a substantial number of axial stages with each succeeding stage having smaller and smaller rotor blades for incrementally increasing pressure of the airflow channeled therethrough.

Accordingly, compressor and turbine blades are fundamentally different, and each is designed for maximizing aerodynamic efficiency at predetermined design speeds of operation such as the maximum speed associated with takeoff operation of an aircraft or the lower speed associated with cruise operation of the aircraft. Compressor blades, and fan blades as used herein, must also be designed to provide an adequate stall margin at maximum compression ratios for maximizing propulsion thrust with minimum weight and fuel consumption. Since the compressor blades pressurize the air used in the combustion process for generating the combustion gases, they affect the temperature of the combustion gases discharged to the HPT which must remain within acceptable levels for ensuring a useful life of the HPT rotor blades.

Furthermore, fan and compressor blades may be operated at various speeds with the airflow thereover varying in speed from subsonic, transonic, and supersonic which also must be accommodated in blade design. In a fan blade, for example, the blades generate noise during operation which must be maintained within acceptable limits.

Accordingly, improvement in fan or compressor blade performance is desirable for increasing efficiency and stall margin at increased stage compression ratios. In turn, thrust may be increased with reductions in weight and fuel consumption, and fewer stages may be used in a typical compressor. Reduced aeromechanical excitation and improved noise characteristics may also be obtained by improving fan blade design. And, lower turbine temperatures may also be obtained from improved fan and compressor blade designs for increasing hot section life.

SUMMARY OF THE INVENTION

A self bleeding rotor blade and method of operation are disclosed for reducing boundary layer thickness for improved performance. The rotor blade includes an outer surface configured for pressurizing air flowable thereover with bleed apertures being disposed therein for bleeding a portion of boundary layer air from the outer surface during operation and thereby decreasing its thickness for improving aerodynamic performance of the blade.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
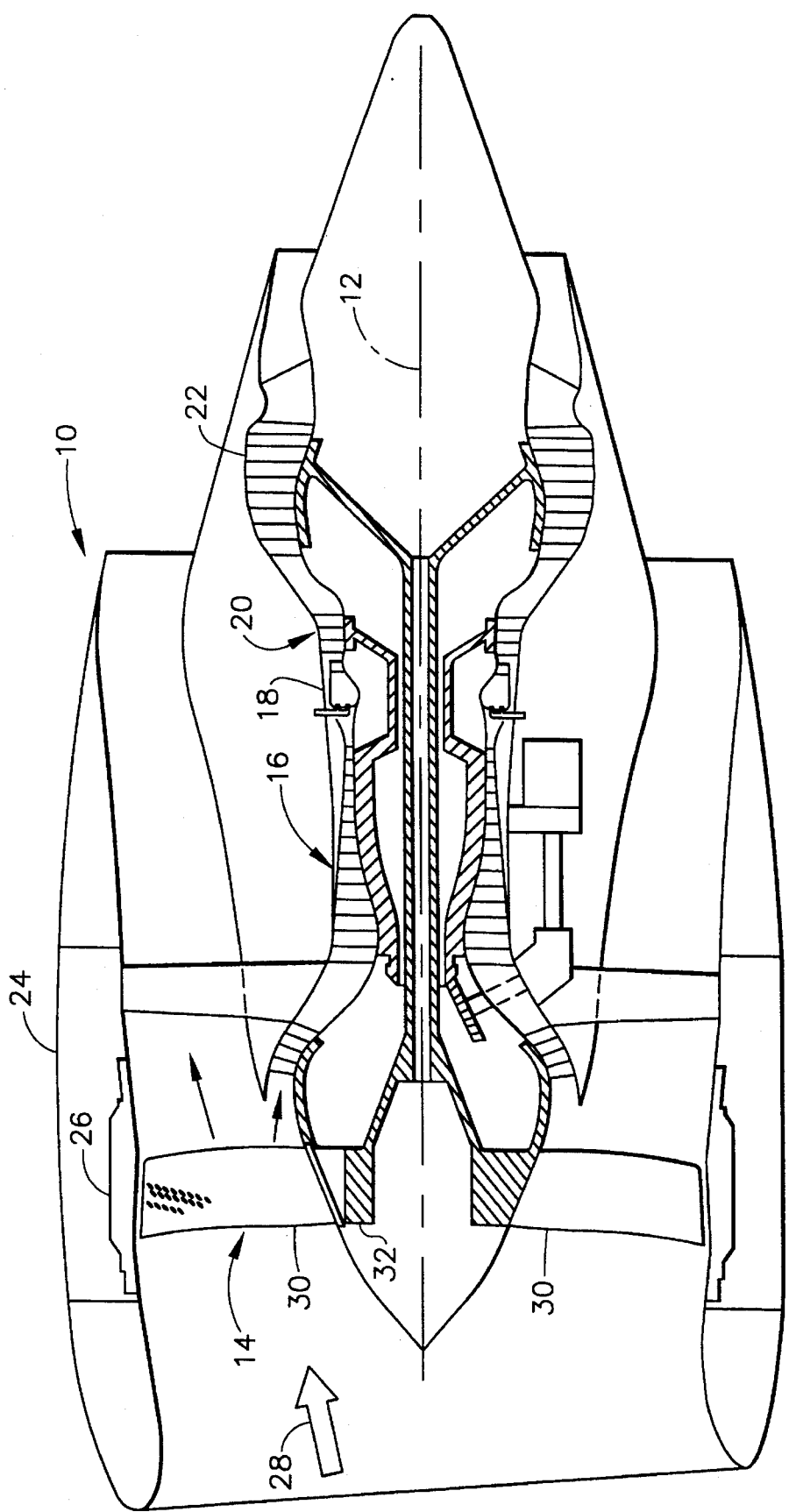
FIG. 1 is a schematic, longitudinal sectional view of an exemplary turbofan gas turbine engine having a fan including rotor blades in accordance with one embodiment of the present invention.

Illustrated schematically in FIG. 1 is an exemplary high bypass, turbofan gas turbine engine 10 having in serial flow communication about an axial or longitudinal centerline axis 12 a fan 14 in accordance with one embodiment of the present invention, a compressor 16, a combustor 18, a high pressure turbine (HPT) 20, and a low pressure or power turbine (LPT) 22. The fan 14 is disposed within a conventional nacelle 24 having a conventional annular casing 26 circumferentially surrounding the fan 14.

During operation, ambient air 28 enters the nacelle 24 and is pressurized by the rotating fan 14 with a portion of the pressurized air being discharged from the nacelle 24 for providing thrust for powering an aircraft (not shown), with another portion of the pressurized air being channeled to the compressor 16 wherein it is further compressed and discharged to the combustor 18 wherein it is mixed with fuel and ignited for generating combustion gases which flow downstream therefrom in turn through the HPT 20 and the LPT 22 for respectively powering the compressor 16 and the fan 14 in a conventionally known manner.

The fan 14 includes a plurality of circumferentially spaced apart fan or rotor blades 30 conventionally joined to a fan rotor disk 32 with in turn is conventionally joined to the HPT 20 for being rotated thereby. An exemplary one of the fan blades 30 is illustrated in more particularity in FIGS. 2 and 3 and includes an airfoil 34 over which is flowable the air 28 joined to a conventional platform 36 providing a radially inner boundary of the air 28, and an integral conventional axial-entry dovetail 38 which secures the fan blade 30 to the disk 32 through a complementary dovetail slot 40.

The general configuration of the fan blade 30 may take any conventional form with or without the platform 36 or the dovetail 38. For example, the fan blade 30 may be alternatively formed integrally with the disk 32 as one assembly conventionally referred to as a blisk without a discrete and removable dovetail 38. The fan blade 30 may also be of the conventional solid-type or hollow-type as desired.

The present invention relates specifically to the airfoil 34 of the blade 30 for improving aerodynamic performance thereof. More specifically, the airfoil 34 includes a generally concave suction side outer surface 42, and an opposite generally convex pressure side outer surface 44 joined together at leading and trailing edges 46, 48 and extending radially along the longitudinal or radial axis of the blade 30 from a root 50 at the platform 36 to a radially outer tip 52 facing the casing 26 and spaced therefrom to define a predetermined tip clearance C therebetween. Since the fan blade 30 is a type of compressor blade, the outer surfaces 42, 44 are conventionally configured for pressurizing the air 28 as it flows thereover during operation, with the blades 30 and disk 32 rotating in the direction designated R in FIG. 3 with the pressure side 44 preceding the suction side 42. As the air 28 flows axially over the airfoil 34 from the leading edge 46 to the trailing edge 48 its pressure rises due to the configuration of the outer surface of the airfoil 34. The terms suction side 42 and pressure side 44 are used herein as typically referred to by those skilled in the art with it being understood that they are relative terms with higher pressures being effected over the concave pressure side 44 than over the convex suction side 42. Suction side pressures are nevertheless positive.

Figure 4:
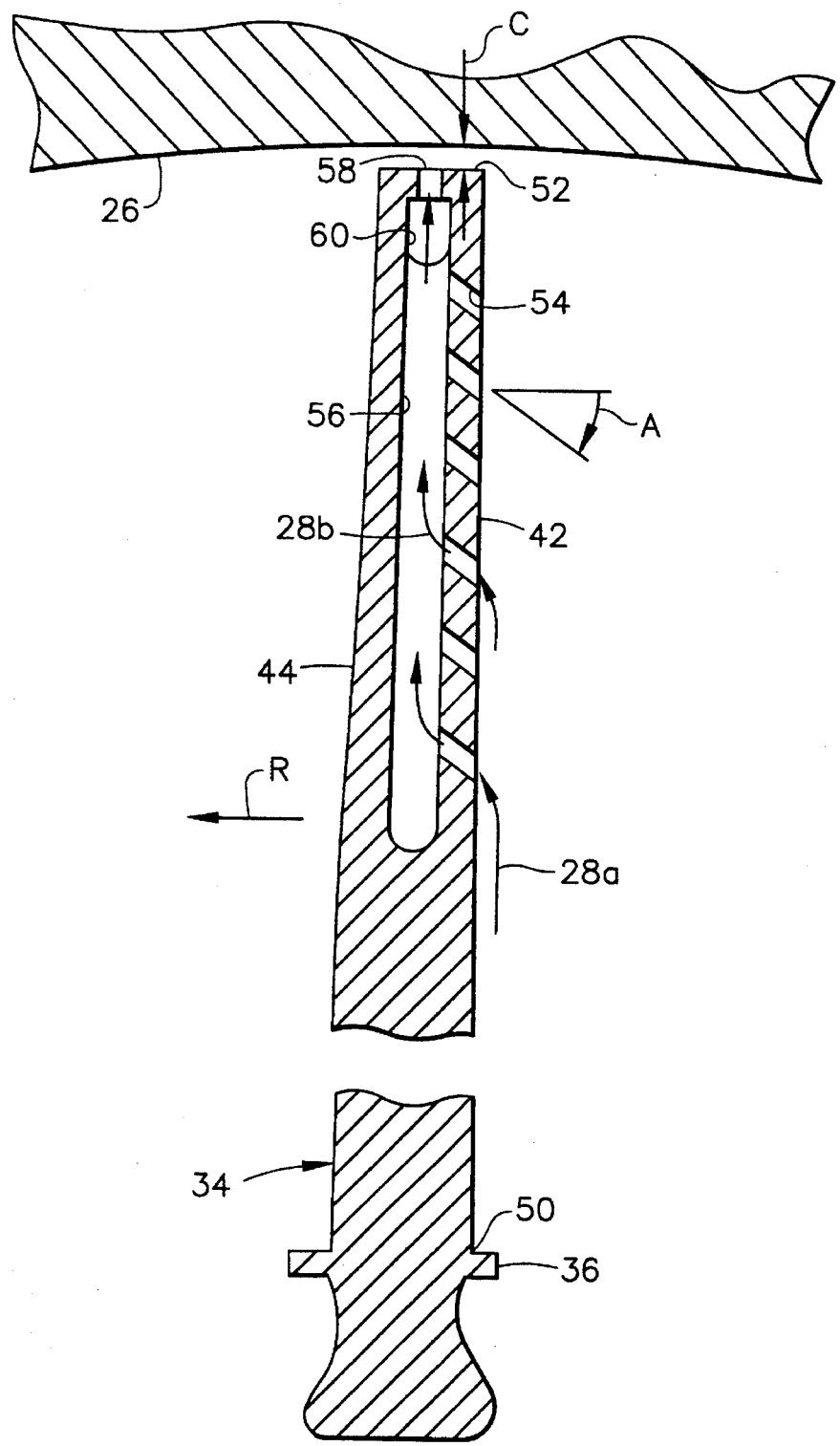
FIG. 4 is a sectional view through the fan blade airfoil illustrated in FIG. 2 and taken along line 4—4.
Figure 5:
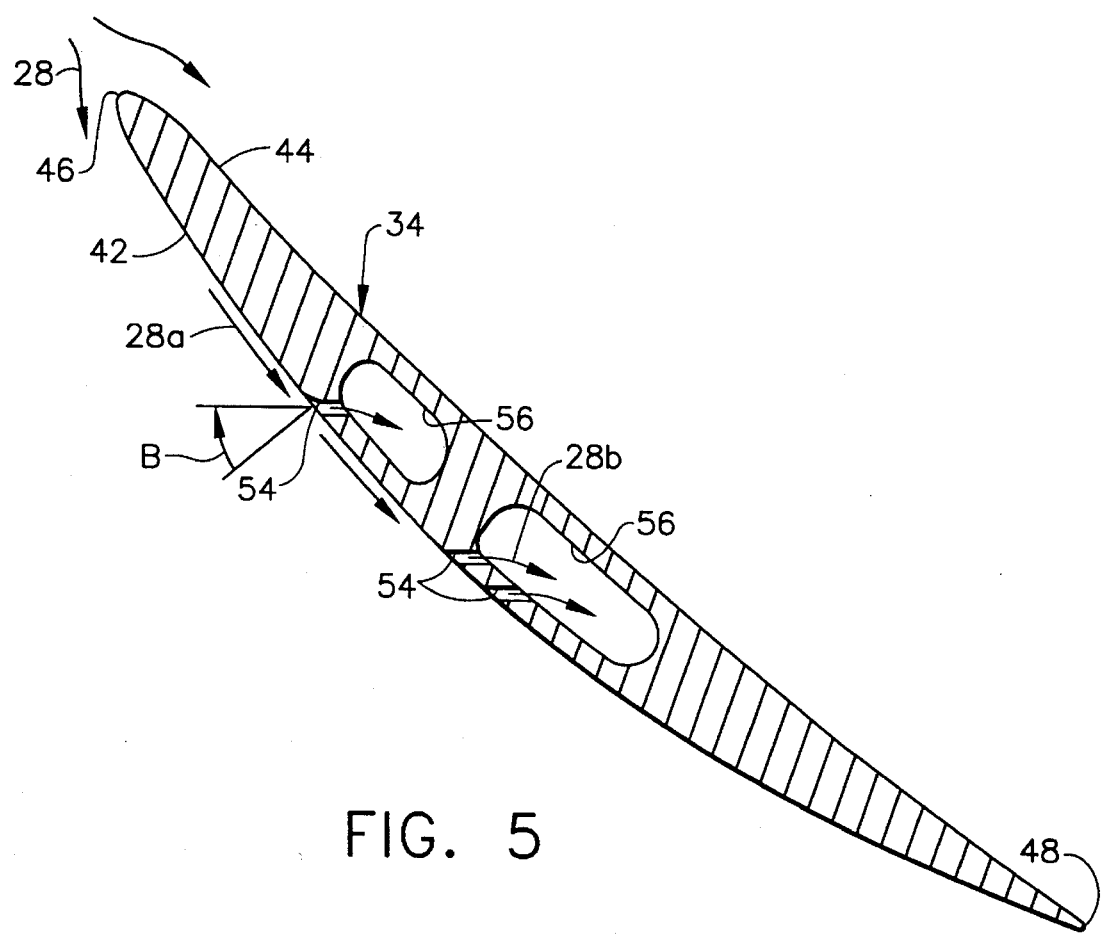
FIG. 5 is a radial sectional view of a portion of the airfoil illustrated in FIG. 2 and taken along line 5—5.

As is conventionally known, as the air 28 flows over the airfoils 34, a boundary layer of air designated 28a forms along the outer surfaces 42, 44 as shown in FIGS. 4 and 5, and has a reduced velocity compared to that of the free stream air 28. In conventional fan blades, the boundary layer increases in thickness as it flows downstream from the leading to trailing edges of the blade and may possibly separate from the airfoil surface during adverse conditions. It is conventionally known that performance of fan or compressor blades decreases as the boundary layer increases in thickness.

Figure 2:
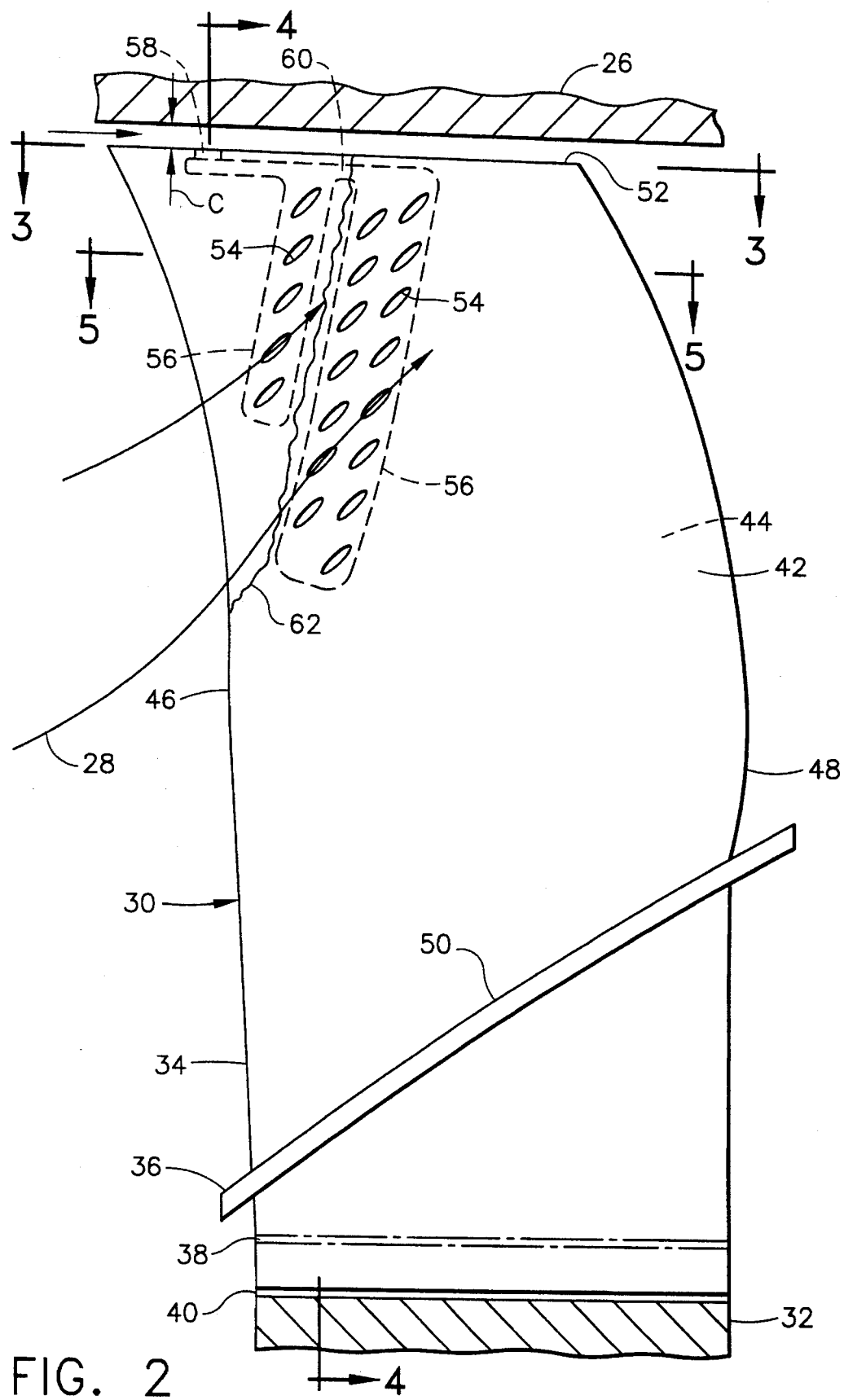
FIG. 2 is a side elevation view of an exemplary rotor blade of the fan illustrated in FIG. 1 disposed adjacent to an annular casing, with the blade having a plurality of bleed apertures in the airfoil portion thereof.

Accordingly, in accordance with the present invention as illustrated in FIG. 2, for example, means are provided in the exemplary form of a plurality of bleed apertures or inlets 54 disposed in the airfoil 34 for withdrawing or bleeding a portion of the boundary layer air 28a from the airfoil outer surface, such as the suction surface 42 for example, and into the airfoil 34 for reducing the thickness of the boundary layer for improving aerodynamic performance.

Figure 3:
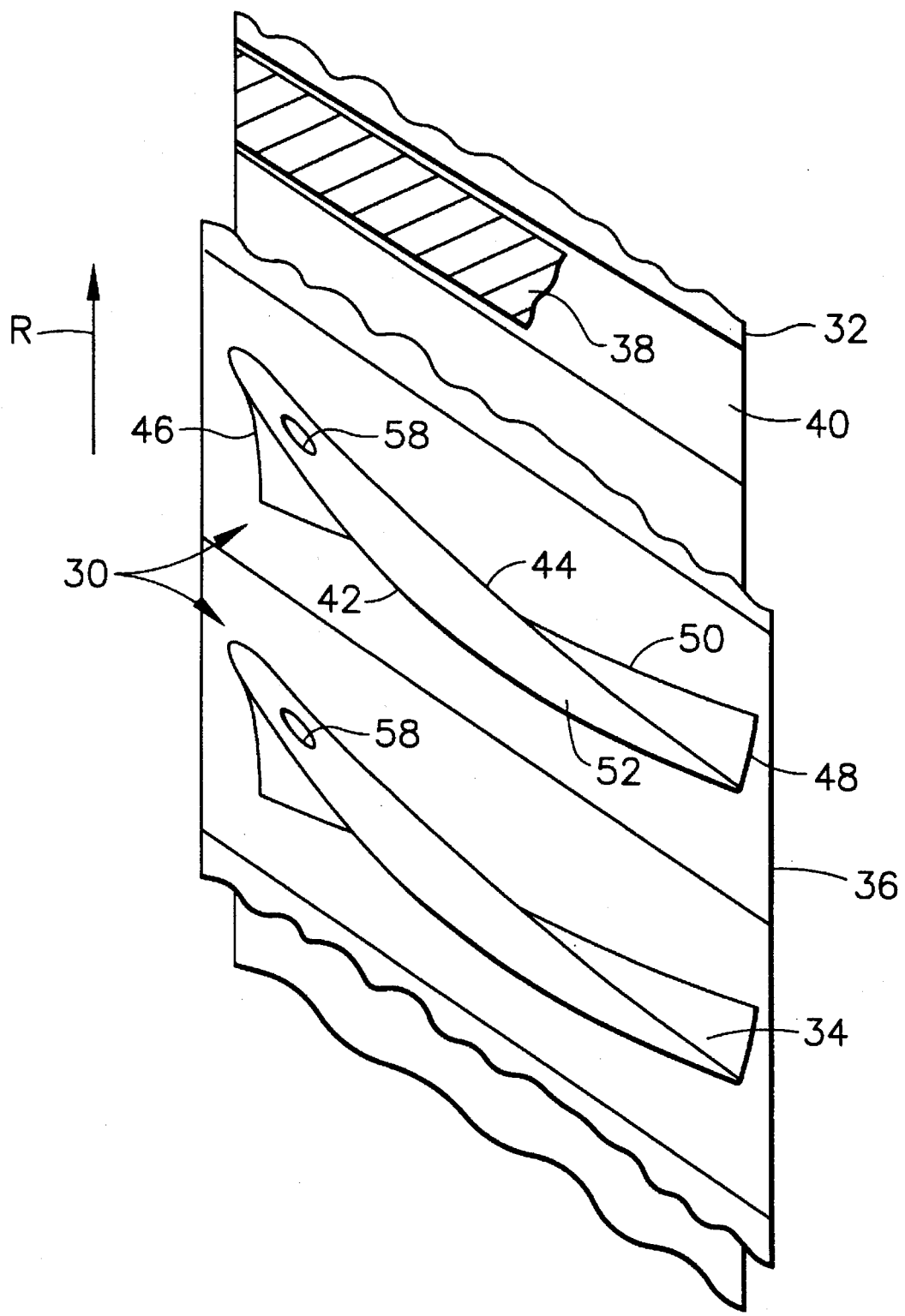
FIG. 3 is a top view of the fan illustrated in FIG. 2 and taken along line 3—3.

It is conventionally known that boundary layer air increases substantially in thickness on the suction side of a fan or compressor blade, whereas the boundary layer is more well behaved on the pressure side of the blade. Accordingly, the bleed apertures 54 are preferably disposed in the airfoil suction surface 42 suitably downstream from the leading edge 46 for effectively bleeding a portion of the boundary layer air 28a for improving performance of the airfoil 34. The bleeding means are preferably self-powered in the configuration of the rotor blades 30 and further include a bleed channel 56 disposed inside the airfoil 34 and joined in flow communication with the plurality of bleed apertures 54 for channeling bleed air 28b drawn into the airfoil 34 through the apertures 54 for discharge from the airfoil 34 through a bleed aperture or outlet 58 disposed at the airfoil tip 52 and in flow communication with the bleed channel 56 as shown in FIGS. 2–4. In this exemplary embodiment, a single bleed outlet 58 is used and extends directly radially outwardly. It has a generally elliptical, elongated profile along the chordal direction and is generally centered to provide an effective amount of flow area and minimizes stress concentration to ensure effective structural life.

Accordingly, the bleeding means provide an inlet through the bleed apertures 54 in the airfoil suction surface 42 for drawing off a portion of the boundary layer air 28a for flow upwardly inside the airfoil 34 through the bleed channel 56 for discharge radially outwardly through the bleed outlet 58. Since the blade 58 rotates during operation, centrifugal forces due to the rotation provide some energy for bleeding the boundary layer air 28a into the airfoil 34. Since the tip clearance C as illustrated in FIGS. 2 and 4 has a relatively low pressure during operation as compared to that pressure over the suction surface 42 and in the space between adjacent ones of the airfoils 34, a differential pressure exists between the bleed apertures 54 and the bleed outlet 58 for driving and bleeding the boundary layer air 28a into the airfoil 34 for discharge to the tip clearance C. In this way, the bleeding mechanism is self-powered or is self-bleeding and does not require the use of external power for ensuring a net performance improvement.

An improved method of improving aerodynamic efficiency of the fan blade 30 results by merely rotating the blade 30 during operation for channeling and pressurizing the ambient air 28 from the leading to trailing edges 46, 48 of the airfoil 34, and then selectively bleeding into the airfoil 34 a portion of the boundary layer air 28a formed on the outer surface, for example the suction surface 42, of the airfoil 34 to reduce the boundary layer air thickness.

Since the blade 30 may take any conventional fan or compressor blade-type configuration and may operate at various rotational speeds, the airflow thereover may also have varying speeds, with the speeds varying during operation of the blade in any one given design from low to high power operation of the engine. Accordingly, the blade 30 may operate with subsonic, transonic, and/or supersonic speeds of the air 28 over the airfoils 34. In the preferred embodiment of the present invention, the bleed apertures 54 are disposed on the suction surface 42 of the airfoil 34 at a predetermined axial or chordal location between the leading edge 46 and the trailing edge 48 for effectively drawing off a portion of the boundary layer air 28a for effectively reducing the thickness thereof to improve aerodynamic performance. Since the typical boundary layer increases in thickness from the leading edge 46 to the trailing edge 48, the bleed apertures 54 are located relatively downstream along the airfoil 34 wherein the boundary layer thickness would otherwise be undesirably large generally. For example, the bleed apertures 54 may be effectively positioned downstream at about 50% of the chordal distance between the leading and trailing edges 46, 48 in that portion of the airfoil 34 closer to the trailing edge 48 wherein the boundary layer would ordinarily have its greatest thickness. Furthermore, the boundary layer also increases in thickness from the root 50 to the tip 52 as the boundary layer migrates radially outwardly during operation. The bleed apertures 54 are therefore also preferably located closer to the airfoil tip 52 than to the airfoil root 50, and in the exemplary embodiment illustrated in FIG. 2 are disposed generally radially above the pitch or mid-span location of the airfoil 34.

Accordingly, the bleed apertures 54 are preferably arranged generally in a line or column extending generally longitudinally or radially from adjacent the airfoil tip 52 toward the airfoil root 50 relative to the longitudinal axis of the blade 30 itself. The inclination or orientation of the column of bleed apertures 54 is preferably selected for each design application to maximize the effectiveness of bleeding air for reducing the boundary layer thickness as desired to improve aerodynamic performance.

As indicated above, the fan blade 30 typically operates at various speeds during operation, with the configuration of the boundary layer, therefore, typically being different on the airfoil 34 depending upon the design point of operation. Since a typical gas turbine engine is aerodynamically designed for a certain design point such as cruise or maximum takeoff operation of the aircraft which it propels, the column of bleed apertures 54 may be selected primarily for a given design point, or, as illustrated in FIG. 2, a plurality of columns of the bleed apertures 54 may be provided and spaced axially apart from each other with each column being preferentially located on the airfoil 34 to provide optimum bleed of the boundary layer air for a given and different design point or rotor speed. In the exemplary embodiment illustrated in FIG. 2, the aft-most column of bleed apertures 54 is located closest to the trailing edge 48 for providing enhanced bleeding at maximum rotor speed such as at maximum takeoff operation of the engine. The forward-most column of bleed apertures 54 is disposed closest to the leading edge 46 for obtaining enhanced bleeding at a part-speed operation of the engine such as cruise for example. In this way, bleeding and performance enhancement, may be maximized at different design points of operation utilizing respectively located columns of the bleed apertures 54.

The respective columns of bleed apertures 54 may be joined in flow communication to a single one of the bleed channels 56, or each may be joined to a respective, discrete bleed channel 56. However, in a preferred embodiment of the invention, the first two adjacent columns of bleed apertures 54 closest to the leading edge 46 include respective, discrete bleed channels 56 in flow communication therewith with the two bleed channels 56 being disposed at their radially outer ends in flow communication with a bleed manifold 60 which in turn is disposed in flow communication with the bleed outlet 58. In this way, all of the bleed apertures 54 are disposed in flow communication with the bleed outlet 58, but the separate columns of bleed apertures 54 are fluidly isolated from each other except through the common bleed manifold 60. Since the pressure of the boundary layer increases in the axial direction over the airfoil 34, isolating the several columns of bleed apertures 54 from each other reduces or prevents flow communication therebetween due to the increasing pressure over the airfoil 34. For example, this arrangement is configured to restrain flow from the aft column of bleed apertures 54 back to the suction surface 42 through the forward column of bleed apertures 54 at the maximum takeoff design point of operation for example, wherein the pressure over the aft column is greater than over the forward column. The manifold 60 is suitably sized to allow flow primarily out the bleed outlet 58, with a backflow restriction being provided at the relatively small junction with the forward column channel 56.

As shown in FIG. 2, the several columns of bleed apertures 54 are located preferably downstream or axially aft of the common bleed outlet 58. The bleed manifold 60, therefore, extends from the aft-most column of bleed apertures 54 adjacent to the trailing edge 48 upstream or axially forward to the bleed outlet 58 preferably disposed adjacent to the leading edge 46 at the airfoil tip 52. Since the pressure in the tip clearance C is relatively low as indicated above, and is lowest near the leading edge 46 of the airfoil 34, the bleed outlet 58 is preferably located suitably close to the leading edge 46 to maximize the pressure differential between the bleed apertures 54 and the bleed outlet 58 for self-powering the bleeding operation.

Each of the bleed channels 56 may be joined in flow communication with a single column of the bleed apertures 54 as indicated above, or, as also shown in FIG. 2, each bleed channel 56 such as the aft-most channel 56 may be disposed in flow communication with two or more columns of the bleed apertures 54 as required for providing an effective amount of collective flow area of the bleed apertures 54 for effectively bleeding the boundary layer air 28a for effectively reducing the thickness thereof. As shown in FIG. 2, the cooperating columns in the common aft bleed channel 56 are preferably radially staggered with each other for maximizing bleed area in a minimum amount of airfoil material within acceptable stress and life limits.

In an embodiment of the invention wherein the blade 30 is configured for rotating the blade 30 to effect supersonic airflow thereover and a resulting pressure shock wave 62 thereover as shown schematically in FIG. 2, at least one column of the bleed apertures 54 is selectively positioned in the airfoil 34 for bleeding the boundary layer air 28a from the airfoil 34 downstream of the shock wave 62 wherein pressure is increased. Of course, the shock wave 62 illustrated in FIG. 2 is merely a schematic representation of an actual shock wave. The actual location of the shock wave 62 depends upon the particular design application and design point of operation. However, given the existence of the shock wave 62, the bleed apertures 54 may be suitably located in the airfoil 34 downstream thereof for reducing the thickness of the enlarged boundary layer therefrom which would otherwise be formed without the bleed apertures 54.

The location of the bleed holes 54 on the suction surface 42 may be determined using conventional three-dimensional (3D) viscous computational fluid dynamics (CFD) to predict shock interaction with the suction side at the aerodynamic design point and at a 95% speed off-design point for example. Testing may also be used to determine the required location of the bleed holes 54. Conventionally, as flow passes through a shock, the boundary layer begins to deteriorate causing the air layer thickness to increase rapidly through the shock. The boundary layer may separate downstream of the shock, resulting in substantial performance and stall margin penalties. With suction-side bleed holes in place in accordance with the invention, the effect of the large pressure rise through the shock or the blade surface boundary layer may be considerably reduced, resulting in lower boundary layer thickness downstream of the shock. Flow separation downstream of the shock may therefore be delayed or avoided, with a better behaved boundary layer up to the trailing edge.

Bleeding of the boundary layer air from the airfoil 34 may be accomplished using various types of bleed apertures 54 such as the generally cylindrical apertures 54 illustrated in the Figures, or holes formed in a suitably porous material effective for use for fan or compressor blades, or even elongate slots. The pattern of air bleeding may take the generally linear columns illustrated in FIG. 2 or may take other suitable forms as required for each design application. The boundary layer thickness profile over the outer surfaces of the airfoil 34 may be conventionally determined using analytical or testing techniques for then determining the required location of bleeding air for effective reducing the boundary layer thickness for increasing aerodynamic performance of the blade.

As shown in FIGS. 4 and 5, the bleed apertures 54 are in the form of generally cylindrical holes which are preferably inclined toward the direction of flow of the boundary layer air 28a. More specifically, and referring to FIG. 4, the boundary layer air 28a has one component of velocity in the radial outward direction for flow upwardly toward the blade tip 52. The bleed apertures 54 are therefore inclined downwardly and outwardly through the airfoil 34 at an acute first inclination angle A from the horizontal so that an inlet end of the bleed aperture 54 is disposed on the airfoil suction surface 42 closer to the root 50 than an outlet end thereof is, with the outlet end being disposed in the bleed channel 56 closer to the tip 52. In other words, the outlet end of each bleed aperture 54 is disposed radially higher than its inlet end.

As shown in FIG. 5, the boundary layer air 28a also has a component of velocity in the axial downstream direction, and therefore the bleed apertures 54 are preferably also inclined axially aft and inwardly through the airfoil 34 at an acute second inclination angle B relative to a perpendicular to the suction surface 42 with the inlet end of the bleed aperture 54 being disposed closer to the leading edge 46 than the outlet end thereof is, with the outlet end being disposed closer to the trailing edge 48. The compound axial and radial inclination of the bleed apertures 54 in the exemplary embodiment illustrated in FIGS. 4 and 5 effects an inclined elliptical inlet end in the airfoil suction surface 42 as illustrated in FIG. 2. In this way, the boundary layer air 28a is more efficiently drawn off from the suction surface 42 for improved aerodynamic performance.

Figure 6:
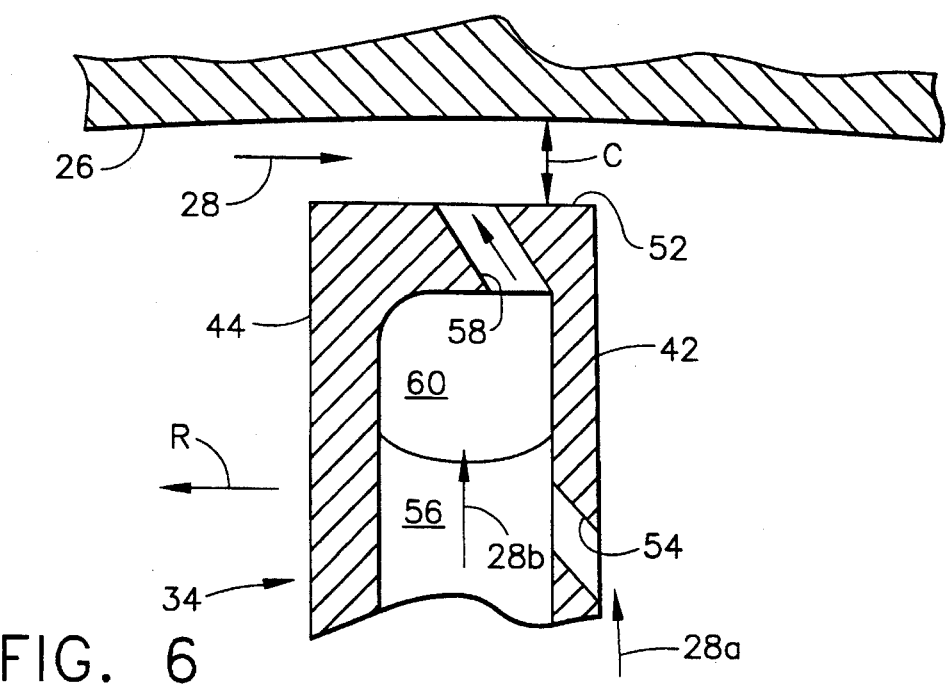
FIG. 6 is an enlarged view of the tip region of the airfoil illustrated in FIG. 4 in accordance with another embodiment of the present invention.

FIG. 6 illustrates an alternate embodiment of the bleed outlet 58 at the tip 52 of the airfoil 34. The tip clearance C is typically sized as small as practical to reduce leakage of the airflow 28 therethrough yet must be sufficiently large to reduce the occurrence of rubs of the tip 52 with the casing 26. By discharging the bleed air from the manifold 60 through the bleed outlet 58 into the tip clearance C, the bleed air effectively blocks a portion of the leakage of the ambient air 28 through the tip clearance C. To enhance this blocking effect, the bleed outlet 58 may be inclined forwardly and outwardly from the suction surface 42 toward the pressure surface 44 in the direction of rotation R of the airfoil 34 to impart a forward component of velocity to the bleed air being discharged from the outlet 58.

Although a single bleed outlet 58 is illustrated in the embodiments shown in FIGS. 3 and 6, for example, additional bleed outlets may be provided as desired. The single bleed outlet 58 illustrated in FIG. 3 may be elongated along the chord of the airfoil 34 as required for providing a suitable amount of discharge flow area, with the aperture 58 being centered between the opposite sides of the airfoil 34 for improved strength.

Fan or compressor blades may effectively use bleeding in accordance with the present invention for decreasing boundary layer thickness over the outer surface of the airfoil, such as the suction surface thereof, for improving aerodynamic efficiency as well as stall margin. The stage compression ratio may then be increased for improving thrust and specific fuel consumption with reduced weight. Reduced boundary layer thickness may also effectively reduce aeromechanical excitation of the rotor blades. And, in a transonic or supersonic rotor blade, the performance degradation due to shock and boundary layer interaction may also be reduced by reducing the thickness of the boundary layer in accordance with the present invention.

The improved fan blade 30 may in turn result in lower turbine temperatures and therefore increase hot suction life. This is particularly significant for maximum speed or maximum takeoff operation of an aircraft engine having a fan blade in accordance with the present invention since improved performance therefrom can be used for lowering turbine inlet temperatures.

As indicated above, the invention may be used in either fan or compressor blades as desired, with the fan blade illustrated in FIG. 2 having an improved forward swept design as is conventionally known for further increasing aerodynamic performance thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A gas turbine engine rotor blade comprising an airfoil having a root, a tip, and an outer surface for pressurizing air flowable thereover, and means for bleeding boundary layer air from said airfoil outer surface and into said airfoil disposed closer to said airfoil tip than to said airfoil root;

said airfoil further including suction and pressure outer surfaces joined together at leading and trailing edges and extending from said root to said tip; and said bleeding means including a plurality of bleed apertures disposed in said airfoil suction surface and joined in flow communication with a bleed channel disposed inside said airfoil for channeling said bleed air thereto, and a bleed outlet disposed at said airfoil tip and in flow communication with said bleed channel for discharging said bleed air from said air foil, said bleed apertures being arranged generally in a plurality of spaced apart columns extending generally longitudinally from adjacent said airfoil tip toward said airfoil root.

2. A rotor blade according to claim 1 wherein said bleed apertures are inclined through said airfoil with an inlet end disposed on said airfoil suction surface closer to said root than an outlet end disposed in said bleed channel closer to said tip.

3. A rotor blade according to claim 2 wherein said bleed apertures are also inclined through said airfoil with said inlet end disposed closer to said leading edge than said outlet end is, said outlet end being closer to said trailing edge.

4. A rotor blade according to claim 1 wherein adjacent ones of said columns of bleed apertures include a respective, discrete bleed channel in flow communication therewith, and further including a bleed manifold disposed in flow communication with said plurality of bleed channels and said bleed outlet.

5. A rotor blade according to claim 4 in combination with a stationary casing spaced from said airfoil tip to define a tip clearance therebetween, and said bleed outlet is disposed in said airfoil tip and faces toward said casing for discharging said bleed air from said airfoil into said tip clearance.

6. A method of improving aerodynamic efficiency of a gas turbine engine rotor blade having an airfoil for pressurizing air flowable thereover comprising:

rotating said rotor blade for pressurizing said air from a leading edge to a trailing edge of said airfoil and to effect supersonic airflow thereover and a shock wave therefrom; and bleeding into said airfoil closer to a tip of said airfoil than to a root of said airfoil and downstream of said shock wave a portion of boundary layer air formed on said airfoil to reduce the thickness thereof.

7. A method according to claim 6 further comprising bleeding said boundary layer air along a column extending from adjacent a tip of said airfoil toward a root of said airfoil.

8. A method according to claim 6 further comprising bleeding said boundary layer air along a plurality of spaced apart columns, said columns being differently positioned between said airfoil leading edge and trailing edge for respectively reducing boundary layer thickness at predetermined, different operating speeds of said rotor blade.

9. A method according to claim 6 further comprising channeling said air bled from said airfoil through said airfoil and discharging said bleed air from said airfoil through a tip thereof.

10. A method according to claim 9 further comprising discharging said bleed air from said airfoil at said airfoil tip adjacent said airfoil leading edge.

11. A method according to claim 6 further comprising bleeding said boundary layer from a suction surface of said airfoil.

* * * * *